No. 836,634. PATENTED NOV. 20, 1906.
H. R. CORBETT.
FLY CATCHING DEVICE.
APPLICATION FILED NOV. 28, 1904.
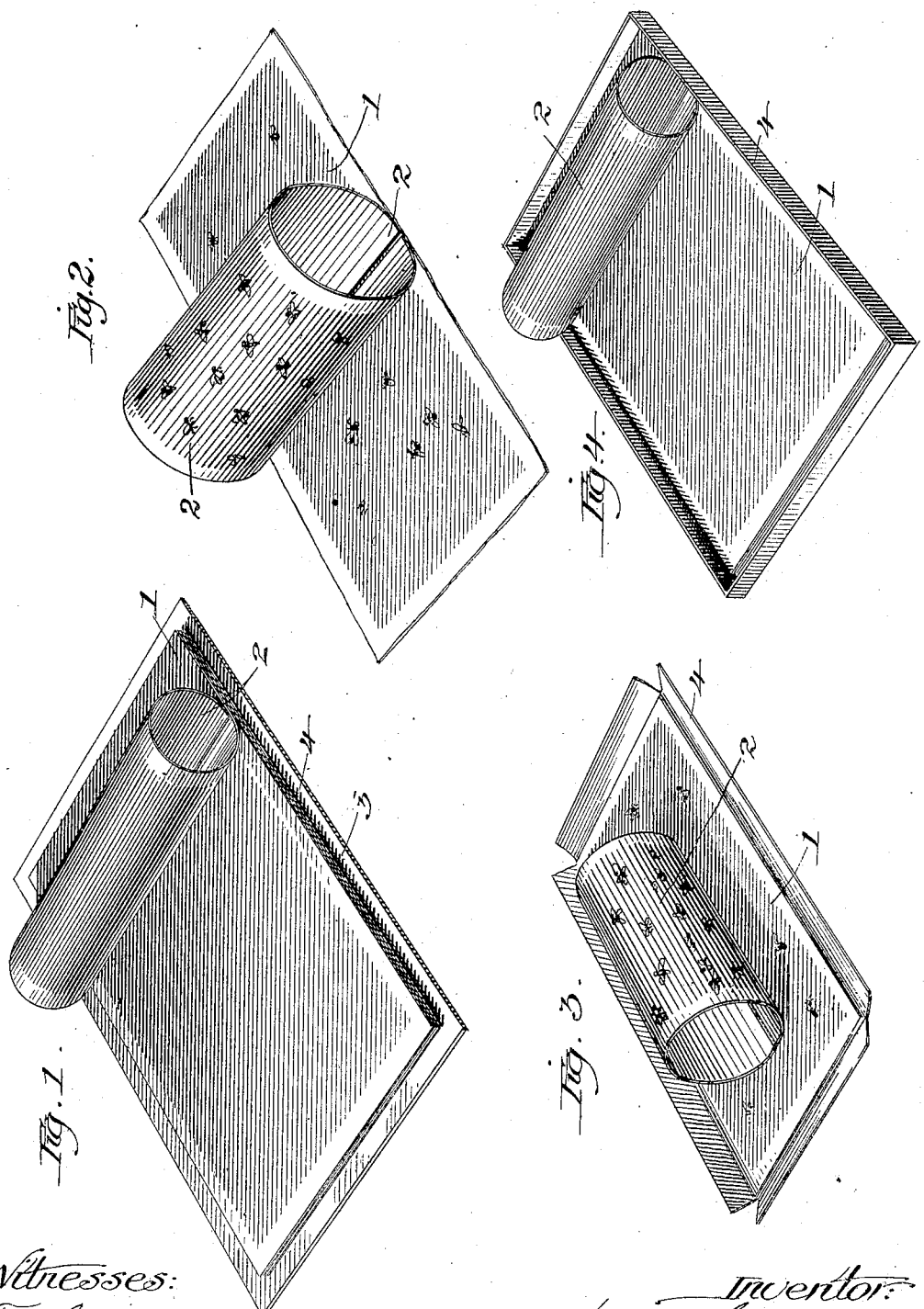
Witnesses:
Frank Blanchard
W. Perry Hahn
Inventor:
Henry R. Corbett
By James Addington
Attorneys.

UNITED STATES PATENT OFFICE.

HENRY R. CORBETT, OF CHICAGO, ILLINOIS, ASSIGNOR TO BEE HIVE FLY CATCHER COMPANY, OF KENOSHA, WISCONSIN, A CORPORATION OF WISCONSIN.

FLY-CATCHING DEVICE.

No. 836,634.　　　　Specification of Letters Patent.　　　Patented Nov. 20, 1906.

Application filed November 28, 1904. Serial No. 234,520.

*To all whom it may concern:*

Be it known that I, HENRY R. CORBETT, a citizen of the United States, residing at Chicago, in the county of Cook and State of Illinois, have invented new and useful Improvements in Fly-Catching Devices, of which the following is a full, clear, concise, and exact description, reference being had to the accompanying drawings, forming a part of this specification.

My invention relates to improvements in devices for catching flies, and more particularly to that class of devices in which one or more surfaces thereof are coated with a sticky substance to which the flies are attracted and upon which they are caught when they alight. The present method of using such devices is to coat flat sheets of paper with a sticky substance, these sheets being adapted to be placed about the apartment in such a manner that the flies may alight thereon. It is a well-known fact that flies are attracted more quickly to a raised or curved surface than to a flat surface, and from many experiments I have discovered that a cylinder or roll with a sticky surface is the form of raised or curved surface most attractive to flies, and my present invention relates to means for presenting such a cylindrical or rolled surface for attracting flies. To this end I preferably form a roll the outer side of which is covered with any desired sticky substance in which the flies are caught when they alight. In order that the surface may be increased, the roll may be mounted upon a flat sheet, the roll serving, primarily, to attract a number of flies, and after the same has become covered the sheet upon which it is mounted also being used for the same purpose, it having been noted that after a few flies have alighted upon any particular spot others will continue to alight in that vicinity, being apparently attracted by those already upon the device.

My device consists, primarily, of a roll or cylindrical portion which may be covered with a sticky substance to which the flies are attracted, both by the form of the roll and by the nature of the sticky substance, and a flat base portion upon which the roll portion rests and which is also covered with the same substance. The base portion may be formed of any suitable material, although I preferably form the same of paper, which is also the material I preferably use for forming the roll or cylinder, although any other material may be used. The roll rests upon the base portion, and I preferably leave around the edges of the base portion a small margin not covered with sticky substance, and the roll also has a margin at its two ends which is not covered with sticky substance.

I have illustrated my device in the accompanying drawings, in which—

Figure 1 shows a perspective view of my device. Fig. 2 is a view of a modification thereof. Fig. 3 is a view of another form in which my device may be made, and Fig. 4 shows still another form of constructing the same.

In Fig. 1 I have shown my device as having a base portion 1, formed of a plurality of sheets of paper for use in succession, each sheet having the upper surface thereof covered with sticky substance and laid one upon another, the roll 2 being formed upon the top sheet, as shown. The device is so constructed that when the roll and the top sheet on which it rests are covered with flies the same may be removed and the next flat sheet stripped back to form another roll, coated with fresh material, and resting upon a sheet which is also covered with fresh material. By constructing the device of a plurality of sheets of paper this process may be continued until all of the sheets have been used. The bottom sheet 3 is made wider than the remaining sheets, and in this way a margin or flange 4 is formed, which prevents the sticky material from coming in contact with the base near the same. This bottom sheet may also be formed of paper of greater thickness than the remaining sheets of paper, thus giving more body or stiffness to the device. The margin or flange 4 may project on all sides of the device, as shown, or it may project on only one or two sides thereof. This flange forms a protection for the entire pad of sheets and protects the articles under or near the sheets from contact with the sticky substance. The roll 2 is also prevented by the flange from coming into contact with the articles near it, owing to the fact that the roll is of the same width as the remaining sheets of paper.

In Fig. 2 I have shown my device in its simplest form, although it will be understood that the device is preferably constructed as shown in Fig. 1.

If desired, as shown in Fig 3, the flange portion 4 may be turned up to form a dish-like structure, or, as shown in Fig. 4, the flange may be entirely turned up, forming a box-like structure. In both of these structures, however, the edges are so arranged that they protect the article upon which the device is laid from the sticky substance in event the same becomes melted and tends to run. Furthermore, when the device is put up in packages in event the sticky substance becomes softened the turned-up projecting edges will tend to preserve the different pads from becoming destroyed by the sticky substance running and causing the contents of the package to stick together.

Having thus described my invention, what I claim as new, and desire to secure by Letters Patent, is—

1. In a device for catching flies, the combination with a body substantially cylindrical in form and covered with a sticky substance, of a flat support for said cylindrical body, the upper surface of which is also covered with a sticky substance.

2. In a device for catching flies, the combination with a hollow body substantially cylindrical in form and having the outer surface thereof covered with a sticky substance, of a flat support therefor having its upper surface also covered with a sticky substance.

3. The combination with a hollow body substantially cylindrical in form and having the outer surface thereof covered with sticky substance, of a support therefor, comprising a plurality of sheets laid one upon the other and each having the surfaces thereof also covered with a sticky substance.

4. The combination with a hollow body substantially cylindrical in form and having the outer surface thereof covered with a sticky substance, of a support therefor, comprising a plurality of sheets laid one upon the other and each having the surfaces thereof covered with a sticky substance, said sheets being adapted to form fresh cylindrical bodies and fresh flat supports as the roll and sheets become covered with flies.

5. The combination with a hollow body substantially cylindrical in form and having its outer surface covered with a sticky substance, of a support therefor, comprising a plurality of sheets, each having the surfaces thereof covered with a sticky substance and laid one upon the other, the bottom one of said sheets being adapted to extend beyond the margins of the remaining sheets.

6. The combination with a hollow body substantially cylindrical in form and having its outer surface covered with a sticky substance, of a support therefor, comprising a plurality of sheets, each having the surfaces thereof covered with a sticky substance and laid one upon the other, the bottom one of said sheets having a margin extending beyond the remaining sheets adapted to be folded up upon the edges of the remaining flat sheets.

7. The combination with a hollow body substantially cylindrical in form and having its outer surface covered with a sticky substance, of a flat support therefor, comprising a plurality of sheets, each having the surfaces thereof covered with a sticky substance and laid one upon the other, the bottom one of said sheets being formed of heavier material and extending beyond the margins of the remaining sheets.

In witness whereof I have hereunto subscribed my name in the presence of two witnesses.

HENRY R. CORBETT.

Witnesses:
W. Perry Hahn,
E. A. Olsen.